Feb. 4, 1936.                 C. W. CRUMRINE                    2,029,913
                                CAMERA LATCH
                             Filed May 14, 1935
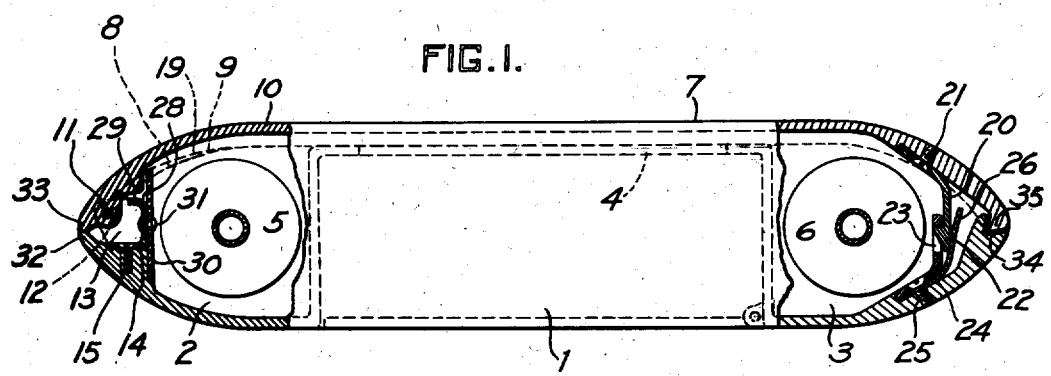
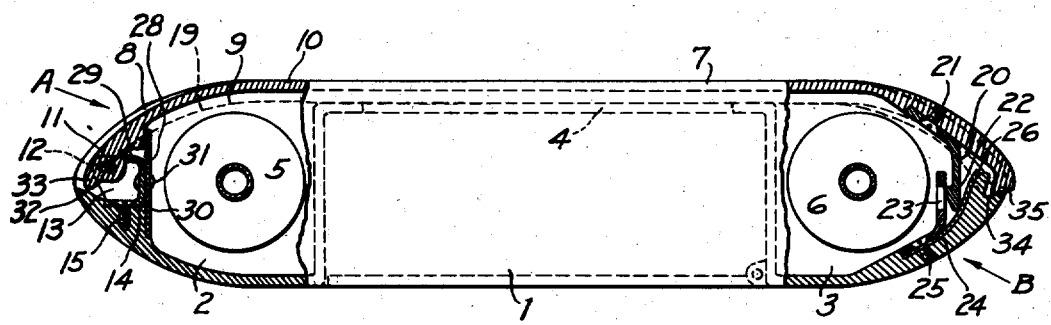
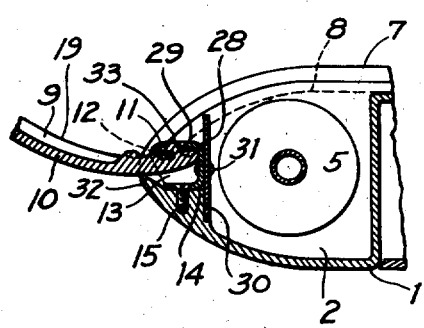
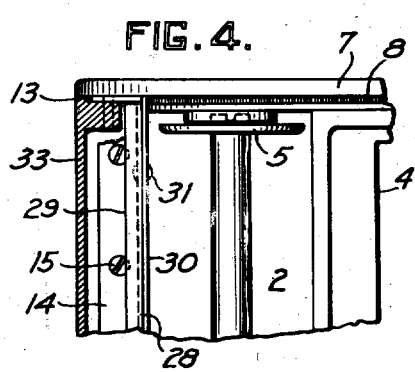
INVENTOR.
Chester W. Crumrine
BY
ATTORNEYS Patented Feb. 4, 1936

2,029,913

UNITED STATES PATENT OFFICE 2,029,913

CAMERA LATCH

Chester W. Crumrine, Rochester, N. Y., assignor to Eastman Kodak Company, Rochester, N. Y., a corporation of New York Application May 14, 1935, Serial No. 21,431

7 Claims. (Cl. 95—32)

This invention relates to latches and particularly to latches adapted for use with cameras. One object of my invention is to provide a simple type of latch which is concealed in the camera body. Another object of my invention is to provide a camera latch between a camera body and a camera back in which the latching elements may be disengaged by sliding the back on the camera body. Another object of my invention is to provide a camera with a hinge back and to provide a lost motion connection in the hinge permitting limited sliding movement of the camera back relative to the camera body to disengage latching elements. Still another object of my invention is to provide a camera with a hinge back which may slide longitudinally of the camera body to and from latching engagement therewith and to provide a spring for normally holding the parts in a latched position. Other objects will appear from the following specification, the novel features being particularly pointed out in the claims at the end thereof.

In cameras and particularly in cameras made of molded products, such as bakelite, cellulose acetate and the like, it is desirable to provide a latch which can be attached to the molded parts and which can be concealed inside of the camera body so as not to mar the appearance of the camera. It is also necessary with cameras to provide a camera latch which will not only hold the camera back securely to the camera body, but which will also provide a light-tight connection between the camera body and back so that light cannot enter and fog the highly light-sensitive material. The present latch has been designed for cameras of the type described and can be used with relatively small cameras since the parts are so shaped and arranged that they take up but little room in the camera body.

Coming now to the drawing wherein like reference characters denote like parts throughout;

Fig. 1 is a side elevation of a camera including a latch constructed in accordance with and embodying a preferred form of my invention, parts being broken away and shown in section;

Fig. 2 is a view similar to Fig. 1, but with the camera back moved relative to the camera body to a position in which the latching elements are disengaged so that the back may be swung open;

Fig. 3 is a fragmentary end elevation showing the camera back swung open upon its pintle, and Fig. 4 is a fragmentary plan view partially in section showing a part of the hinged construction.

In accordance with a preferred embodiment of my invention the camera back is mounted to slide a short distance parallel to the camera body so that when this sliding movement takes place, relatively fixed latching elements carried by the camera back and body may be disengaged permitting the camera back to be swung open upon its hinge.

More specifically a camera may be of the usual type consisting of a camera body 1 which may include the usual spool chambers 2 and 3 at each end between which there may be located an exposure frame 4 across which is wound a film.

A film may be carried by spool 5 in the supply spool chamber 2 and may be wound upon a take-up spool 6 in the exposed film chamber 3. Such a system is commonly used in roll film cameras.

In accordance with my invention the camera body 1 is preferably provided with side walls 7 which extend up the full height of the camera and which are provided with a groove 8 best shown in Figures 3 and 4. This groove is adapted to receive a flange 9 carried by a camera back 10 so as to form a light-tight connection therewith.

The camera back 10 carries a hinged pintle 11 which projects into the elongated apertures 12 in the end flanges 13 of a bracket 14 secured to the camera body by suitable screws 15. Thus, the hinged pintle 11 may slide in the elongated apertures 12 a short distance as, for instance, a 16th of an inch, thus permitting the camera back 10 to slide longitudinally of the camera body 1. This movement is permitted because the flange 9 of the camera back 10 is cut away at 19 so as not to extend down into the bottom of the slot 8 over that portion which lies to the left of the spool 5 referring to Fig. 1. Thus, when the camera back 10 is slid relative to the camera body 1 by pressing on the camera back and on the camera body in the direction shown by the arrows A and B in Fig. 2, the flange 19 may move in the slot 8 permitting the sliding movement of the camera back.

The camera back 10 carries a latch element comprising an arm 20 which may be attached to the back by screws 21 and which carries a hook 22 adapted to engage an aperture 23 on a latch element 24 which may be attached by screws 25 to the camera body. The latch elements 22 and 23 are relatively fixed on their respective parts and are not intended to spring apart. They are rigidly connected to the camera body and back and can only be disengaged by sliding the camera back on the camera body.

I prefer, however, to provide a spring 26 which may be conveniently attached to the camera beneath latch element 24 as best shown in Fig. 1 by passing the screws 25 through apertures in the spring. This spring, by engaging the latch element 20, exerts a thrust upon this element and consequently upon the camera back tending to hold it in its operative position as shown in Fig. 1—that is the position in which the latch elements 22 and 23 are latched together. In this position, the camera back 10 lies between the side walls 7 of the camera body and a neat, smooth, outer contour for the camera is provided. However, as above explained, by moving the back to the position shown in Fig. 2, the latch elements will become disengaged and permit the camera back to swing open to the position shown in part in Figure 3.

It should be noted that bracket 14 is provided with an extension 28 folded over at 29 along its upper edge and that to extension 28 there is fastened a light guard plate 30 in any suitable manner as by the rivets 31. The position of this plate in the camera body 1 is such that the plate 30 extends between the side wall 7 of the camera body entirely across the spool chamber 2. Since it comes close to or touches the inside of the camera back 10, it prevents any light which may enter around the hinged connection from entering the spool chamber 2.

Thus, in spite of the fact that the camera body terminates in an edge 32 which lies in contact with an edge 33 of the camera cover, there is no danger of light penetrating through the hinged end of the cover and casing and fogging film in the spool chamber 2.

At the opposite end the camera is provided with a notch or groove which is substantially V shaped in cross section as shown at 34. The cover is provided with a complementary shaped V portion 35 which snugly fits in the V shaped groove 34 when the camera cover is in an operative or closed position as shown in Fig. 1. The remainder of the contacting portions between the cover of the camera and the camera body are formed by the flange 9 entering the groove 8 down the longitudinal edges of the camera sides 7, so that the entire cover is made light-tight through the connections above described.

The operation of my invention is simple, since in order to open the camera it is merely necessary to press the camera cover and camera body in opposite directions as shown by the arrows A and B in Fig. 2. This causes the hinge pintle 11 to slide in the elongated slot 12 carried by the brackets 13 a distance sufficient to disengage the hook 22 from the aperture 33. As soon as these latch elements are disengaged, the camera cover may be swung upon its hinged pintle until the end 33 of the camera cover swings against the bent portion 29 of the bracket 28. This limits the movement of the cover relative to the camera body and permits the camera to be threaded with film in the usual manner.

To close the camera the camera back 10 is swung in a reverse direction and the latch elements 22 and 23 will become engaged as soon as the cover is closed since the spring 26 will tend to move the camera cover to its operative position shown in Fig. 1. This movement will bring the cover into a light tight position with the flanges 9 engaged in the slots 8 and with the V tongue 35 engaged in the V notch 34. Plate 30 will render the opposite end of the camera back light proof. Because the camera back 10 fits down flush with the side wall 7 of the camera regardless of how the camera is handled, there is no tendency for the camera back to open up unless the back and body are pressed in opposite directions as above described. It should be noted that with the latch structure above described the hinge upon which the camera back turns is concealed from view and the latch elements are also concealed, so that the entire exterior of the camera can be free from metal parts and the exterior finish can be uniform over the entire camera body.

What I claim as new and desire to secure as Letters Patent of the United States is:

1. A latch mechanism for cameras comprising a camera body, a back hingedly attached thereto, the hinge including a pintle and pintle supports permitting the pintle to slide a predetermined distance in its support, and latch elements carried by the camera body and back opposite to the hinge pintle and adapted to be disengaged by sliding the back on its hinge relatively to the camera body.

2. A latch mechanism for cameras comprising a camera body, a back hingedly attached thereto, the hinge including a pintle and pintle supports permitting the pintle to slide a predetermined distance in its support, and latch elements carried by the camera body and back opposite to the hinge pintle and adapted to be disengaged by sliding the back on its hinge relatively to the camera body and a spring tending to hold the camera back in a latching position with respect to the camera body.

3. A latch mechanism for cameras comprising a slotted camera body, a flanged back hinged thereto, said hinge including a pintle and slot permitting limited sliding movement of the camera back on the body, and latch elements carried by the camera back and body and adapted to be disengaged by sliding the camera back relative to the camera body with the flanges of the back engaging the slots in the camera body.

4. A latch mechanism for cameras comprising a slotted camera body, a flanged back hinged thereto, said hinge including a pintle and slot permitting limited sliding movement of the camera back on the body, the flanges on the back engaging the slots in the camera body, the camera body and back each including a fixedly mounted latch element adapted to be engaged and disengaged by sliding the camera back upon the hinge and camera body.

5. A latch mechanism for cameras comprising a slotted camera body, a flanged back hinged thereto, said hinge including a pintle and slot permitting limited sliding movement of the camera back on the body, the flanges on the back engaging the slots in the camera body, the camera body and back each including a fixedly mounted latch element adapted to be engaged and disengaged by sliding the camera back upon the hinge and camera body, and a spring tending to hold the latch elements in engagement.

6. A latch mechanism for cameras, comprising a camera body having an opening with slots extending longitudinally of said opening, a back having flanges engaging said slots, a hinge connection between the camera back and body permitting limited sliding movement of the back on said body longitudinally thereof, a bracket supporting a hinge part extending across the end of the camera body and preventing light from entering between the back and body, and a tongue and groove connection at the opposite end adapted to make a light tight joint, latch elements, carried by the camera back and body adapted to hold the back in an operative, light tight position on the camera body and adapted to be released by sliding the back on its flange and slot connection with the camera.

7. A latch mechanism for cameras, comprising a camera body having side walls and partial end walls with an opening therebetween, a cover adapted to cover said opening and to lie between said side walls, a hinged connection between the cover and body permitting limited sliding movement between the camera body and cover, latch elements adapted to hold the cover and body together, and a spring tending to hold the cover between the side walls of the camera in position to close the opening in the camera body, the latch elements being releasable by sliding the back between the sides and relative to the camera.

CHESTER W. CRUMRINE.